(12) United States Patent
Pino et al.

(10) Patent No.: US 7,342,369 B2
(45) Date of Patent: Mar. 11, 2008

(54) DIFFERENTIAL RIPPLE DETECTION METHOD AND SYSTEM

(75) Inventors: Rafael Jimenez Pino, Valls (ES); Montserrat Angles, Valls (ES)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/383,533

(22) Filed: May 16, 2006

(65) Prior Publication Data

US 2007/0194736 A1 Aug. 23, 2007

Related U.S. Application Data

(60) Provisional application No. 60/774,731, filed on Feb. 17, 2006.

(51) Int. Cl.
*E05F 15/00* (2006.01)
*G05B 19/402* (2006.01)

(52) U.S. Cl. .................. 318/293; 318/286; 318/379

(58) Field of Classification Search ........ 318/244–246, 318/265–267, 280, 286, 291, 293, 375, 379, 318/466–470, 603
See application file for complete search history.

(56) References Cited

U.S. PATENT DOCUMENTS

| | | | | |
|---|---|---|---|---|
| 5,514,977 A * | 5/1996 | Agiman | .................... | 324/772 |
| 5,552,683 A * | 9/1996 | Dargent | .................... | 318/287 |
| 5,798,624 A * | 8/1998 | Wilke et al. | ................ | 318/254 |
| 5,818,178 A * | 10/1998 | Marumoto et al. | ......... | 318/254 |
| 5,977,732 A * | 11/1999 | Matsumoto | .................. | 318/283 |
| 6,078,154 A * | 6/2000 | Manlove et al. | ........... | 318/293 |
| 6,335,600 B1 * | 1/2002 | Kasai et al. | ................ | 318/434 |
| 6,380,757 B1 * | 4/2002 | Draves et al. | ............. | 324/772 |
| 6,437,533 B1 * | 8/2002 | Du et al. | .................... | 318/560 |
| 6,545,439 B2 * | 4/2003 | Kaeufl et al. | ............... | 318/280 |
| 6,617,816 B2 * | 9/2003 | Ohno et al. | ................ | 318/560 |
| 7,064,509 B1 * | 6/2006 | Fu et al. | .................... | 318/439 |
| 2004/0098213 A1 | 5/2004 | Gerlach | | |
| 2004/0107071 A1 | 6/2004 | Gerlach | | |
| 2004/0111233 A1 | 6/2004 | Gerlach | | |

FOREIGN PATENT DOCUMENTS

| | | |
|---|---|---|
| EP | 0997341 A1 | 5/2000 |
| EP | 1453172 A1 | 9/2004 |
| GB | 2060944 A | 5/1981 |
| WO | 2006111144 A1 | 10/2006 |

* cited by examiner

*Primary Examiner*—Bentsu Ro
(74) *Attorney, Agent, or Firm*—Brooks Kushman P.C.

(57) ABSTRACT

Method and system of monitoring operations of an electric motor. The method and system being applicable to any number of motors of the type used to drive moveable members, including but not limited to motors used to drive automatic vehicle windows and motors used to drive automatic vehicle seats.

18 Claims, 2 Drawing Sheets

DIFFERENTIAL RIPPLE DETECTION METHOD AND SYSTEM

CROSS-REFERENCE TO RELATED APPLICATIONS

This application claims the benefit of U.S. provisional application Ser. No. 60/774,731 filed Feb. 17, 2006.

BACKGROUND OF THE INVENTION

1. Field of the Invention

The present invention relates to methods and system associated with ripple detection.

2. Background Art

As is well known, a DC motor comprises a series of coils or inductors wound around a core. With two fixed contacts called brushes, one of the inductors is connected to the polarization voltage, depending on which of the inductors is in contact with said brushes. Each inductor makes contact with the brush during a specific rotation angle of the motor, and then the brush polarizes another inductor.

Known ripple counting techniques are based on the experimental observation of the fact that when the motor rotates and the contact or brush crosses from one pole to the other, a peak occurs in the current curve of the motor, which peak is easily observable by means of a current sensor. By measuring the time elapsed between two of these peaks, the motor rotation period and also the position of the movable element actuated by the motor can be calculated, thereby being able to calculate the instantaneous speed of said movable element. This ripple detection technique will thus permit controlling the position of a movable element, such as an automotive vehicle window, actuated by a DC permanent magnet multi-polar electric motor, with no need to have a positioning sensor or speed sensor.

The ripple is a feature of the current intensity passing through a DC permanent magnet motor and is closely related to the motor rotation, each time the brushes switch from one commutator bar (rotating commutator segment) to another. Current oscillation detection will permit knowing the displacement of the movable element actuated by the electric motor and following up on its position.

Current rippling occurs basically because of the overlapping of two effects. The first one originates in the counter electromotive force induced in the coils or inductors which, assuming that the rotor of the motor were submerged in a uniform magnetic field, makes said counter electromotive force induced in each coil have a rectified sinusoid shape, that is, rippling occurs in the counter electromotive force generated in the entire winding, and this in turn causes rippling in the current intensity which reaches the motor. The second effect is related to the number of coils or inductors contributing at all times to the total counter electromotive force.

In this aspect, two situations can be shown, a first one in which all the coils contribute, and a second one in which there are two short-circuited coils, and therefore, since current does not pass through them, they do not contribute. The first situation occurs when each one of the brushes is in contact with a single commutator bar or rotating commutator segment, which situation is shown in FIG. 1b, then coils d, c, b, a, l, k conduct half of the current, and coils e, f, g, h, i, j conduct the other half, as can be seen in the diagram. However, when each one of the brushes are in contact with two commutator bars, as shown in FIG. 1a, the second situation occurs, the ends of coils j and d are short-circuited, which causes the counter electromotive force generated in coils j and d to not contribute to the total.

SUMMARY OF THE INVENTION

One non-limiting aspect of the present invention relates to ripple detection when power is provided to and removed from an electric motor.

Another non-limiting aspect of the present invention relates to current sensing in multiple directions, including but not limited to a primary direction and secondary direction.

Another non-limiting aspect of the present invention relates to determining angular position as a function of current ripples in current circulating through an electric motor.

Another non-limiting aspect of the present invention relates to adjusting angular position calculations as a function motor inertia.

Another non-limiting aspect of the present invention relates to adjusting angular position calculations as function of motor rebound.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 2:
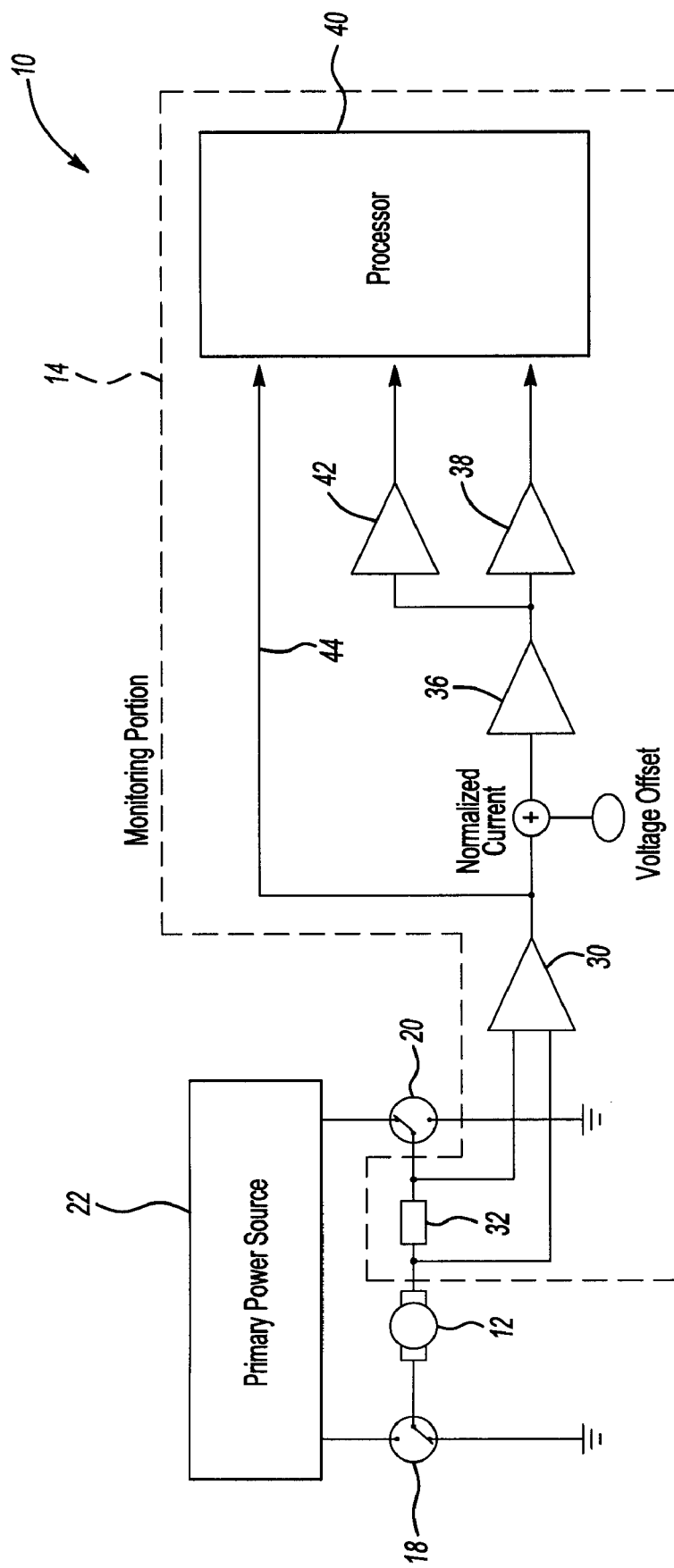
FIG. 2 illustrates a system for monitoring operations of an electric motor in accordance with one non-limiting aspect of the present invention.

FIG. 2 illustrates a system 10 for monitoring operations of an electric motor 12 in accordance with one non-limiting aspect of the present invention. The system includes a current monitoring portion 14 configured to determine speed, movement, angular positions and/or other parameters associated with operations of the electric motor, such as but not limited as a function of current circulating therethrough.

Figure 1A:
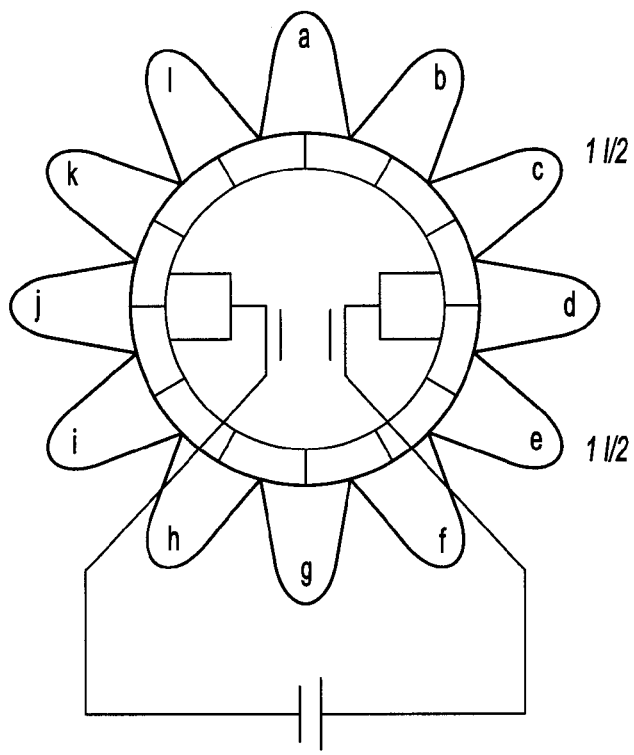
FIGS. 1a-1b illustrate brush contactors within a permanent magnetic electric motor.
Figure 1B:
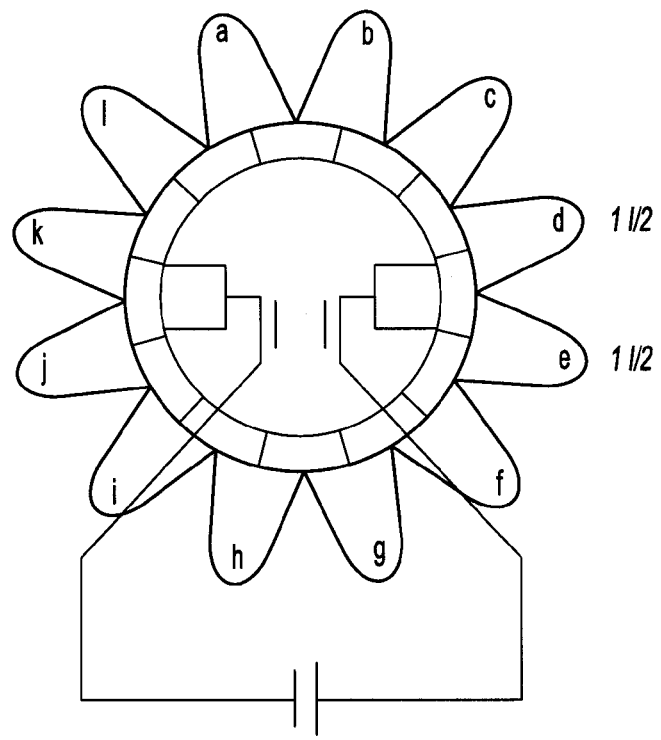

In more detail, the monitoring portion 14 may be configured to determine current ripples within the circulating current, such as the type described above with respect to FIGS. 1a and 1b, and to process the ripples in such as manner as to determine speed, movement, angular positions and/or other parameters associated with operations of the electric motor 12.

The system 10 may be used in any number of environments where motors facilitate movement of moveable objects. For exemplary purposes only, and without intending to limit the scope and contemplation of the present invention, one application of the present invention is explained with respect to the motor 12 being configured to facilitate movement of a vehicle seat (not shown) within a vehicle seat track (not shown) and/or a window (not shown) within a window track (not shown).

As one having ordinary skill in the art will appreciate, such electrically positionable vehicle seats and windows are becoming more and more common in automobiles and other passenger vehicles. With respect to vehicle seats, for example, the passengers may control the electrically positionable vehicle seats by controlling a seat positioning switch (not show) that communicates with a control module (not shown) used to instruct and control operations of the electric motor 10.

One common vehicle seat control function relates to controlling fore and aft positioning of the vehicle seat within the vehicle seat track. The switch may be moveable in a fore direction to instigate forward movement of the vehicle seat and in an aft direction to instigate rearward movement of the vehicle seat. The vehicle seat track may include stops or other stroke limiting elements to prevent the fore and after movements beyond desired bounds of the seat track.

In operation, the passenger ceases the fore and aft seat movement by releasing the switch, and thereby, cutting power supplied to the motor 12. As shown in FIG. 2, the system 10 includes a first and second relays 18-20 to control current from a primary power source 22. In the fore direction, the first relay 18 is connected to ground and the second relay 20 is connected to the primary power source 22, and in the aft direction, the second relay 20 is connected to ground and the first relay 18 is connected to the primary power source 22. When the switch is not actuated (i.e., when no movement is desired), both of the relays 18-20 are connected to ground.

This controls the direction of current flow through the motor 12 and the corresponding movement of the vehicle seat. Of course, any number of other control methodologies may be used without deviating from the scope and contemplation of the present invention and the present invention is not intended to be limited to this methodology or the features used to control the same.

The inertia generated during seat movement may be sufficient to permit continued movement of the seat after the relays are opened and power to the motor ceases. Because movement of the seat is tied to rotation of the motor 12, the motor 12 continues to rotate in proportion to the continued movement of the seat and the motor continues to generate current ripples. One non-limiting aspect of the present invention relates to counting and processing the current ripples occurring after power is cut-off, i.e., after the primary power source 22 is disconnected.

Stops or other elements may be included to impede and/or prevent further movement of the seat, window, etc. These elements provide an obstruction of suitable strength that the force imparted to the stop may cause the seat, window, etc. to rebound in the opposite direction. The rebounding movement causes the circulating current to experience ripples associated with the direction of rebound such that the current ripples include a different sign from the ripples prior to the rebound due to the motor 12 rotating and current flowing in an opposite direction after the rebound. One non-limiting aspect of the present invention relates to counting and processing the current ripples associated with rebounds.

The ability to continue counting current ripples and other current related parameters after power cut-off and motor rebound is advantageous in properly monitoring operation of the vehicle seat, window, or other element associated with the motor. While such movement may correspond with relative small angular rotations of the motor, over time, each successive rotation, if not monitored and reported in accordance with the present invention, can build on prior non-reported rotations such that it may become difficult to accurately determine the true positioning of the seat, window, etc.

The monitoring element 14 may include a bi-directional current sensor 30 to facilitate monitoring and otherwise assessing current under any number of motor 12 operation conditions, including but not limited to those described above. The bi-directional current sensor 30 may be connected to both sides of a shunt resistor 32 or other element having properties sufficient to facilitate monitoring current circulating through the electric motor. Connecting the bi-directional current sensor 30 in this manner, i.e., on both sides of the current regulator 32, allows the current sensor 30 to sense circulating current in primary and secondary directions.

For exemplary purposes, current flowing to the motor 12 from the primary power source 22 and through either one of the relays 18-20 is considered to be current associated with the primary direction, and current resulting from continued rotation of the motor after the relays 18-20 are closed is considered to be current associated with the secondary direction. Optionally, the sensed current may be normalized with a voltage offset in order to avoid saturation and to provide symmetric excursions for positive and negative current values.

The normalized current may then be outputted to a band pass filter 36. The band pass filter 36 may be configured for filtering the current according to a desired frequency range associated with an expected speed range of the electric motor 12. If the motor 12 is used to move a vehicle seat, for example, the expected speed (angular rotation frequency of the motor) at which the seat may be moved for given operating parameters of the motor 12 such that parameters of the band pass filter may be selected to filter out noise and other signals associated with frequencies that are unlikely to occur for the expected operation of the seat.

The filtered current may then be distributed to rippled detector 38. The ripple detector 38 may be configured for counting current peaks within the current circulating through the electric motor 12 in either of the primary and secondary directions, which may then be use by a controller 40 or determining the angular positioning of the electric motor 12.

The controller 40 may be configured to monitor and track ripples detected with the rippled detector 38 such that the controller 40 is able to track positioning of the vehicle seat, window, etc. as a function of the peaks counted over time. As described above, the ability of the present invention to sense current in both of the primary and secondary directions, i.e., before and after power is cut-off to the motor, allows the ripple detector 38 to count ripples occurring with the fore and aft directions, ripples occurring after power cut-off, and ripples associated with rebound activities, which may be helpful in accurately controlling operations of the moveable member driven by the electric motor 12.

The filtered current, in addition to being outputted to the rippled detector 38, may be outputted to a direction detector 42. The direction detector may be configured for determining a direction of an element moved by the electric motor 12 as a function of the current relative to the voltage offset. For example, if the motor 12 is moving in the fore direction, the current may be expected to be a first voltage level relative to movement in the aft direction. The direction detector 42 may keep track of these current levels such that it is able to output directionality information that may be used by the processor to coordinate directionality with the other processed parameters of the electric motor.

Prior to normalization, and in addition to the filter and other operations described above, the sensed current may be directly distributed to the processor 40 over a current input 44. The current input 44 may be used to sense the actual strength (voltage) of the current. This information can be helpful in assessing motor 12 operation in that the signal strength tends to increase when more force is required to move the seat, window, etc.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for monitoring operations of an electric motor, the system comprising:
   a bi-directional current sensor in communication with the electric motor and configured for bi-directional sensing of current circulating through the electric motor, the bi-direction sensor configured to sense current flowing in a primary direction and secondary direction, the primary direction associated with current flow from an external power source to the electric motor and the secondary direction associated with internal current flow resulting from rotation of the electric motor when the external power source is disconnected from the motor;
   a controller in communication with the current sensor to determine an angular position of the electric motor as a function of the current circulating through the electric motor, regardless of whether the current is flowing in the primary or secondary directions; and
   a direction detector in communication with the bi-direction current sensor for determining a direction of an element moved by the electric motor, the direction detector determining the direction of movement as function of the current flowing in the primary and secondary directions.

2. The system of claim 1 further comprising a shunt resistor connected in series with a relay and the electric motor such that the relay connects the resistor and the electric motor to the external power source in a first position and connects the same to ground in a second position, the first position associated with the primary direction and the second position associated with the secondary direction, and wherein the bi-direction current sensor is connected before the relay and to both sides of the shunt resistor in order to sense current flowing in the primary and secondary directions regardless of whether the relay is in the first or second position.

3. The system of claim 1 further comprising a ripple detector in communication with the bi-directional current sensor for counting current peaks within the current circulating through the electric motor in either of the primary and secondary directions, the controller determining the angular positioning of the electric motor as a function of the peaks counted with the rippled detector.

4. The system of claim 1 further comprising a band-pass filter in communication with the bi-directional current sensor and configured for filtering the sensed current according to a desired frequency range associated with an expected speed range of the electric motor.

5. A system for monitoring operations of an electric motor, the system comprising:
   a controller in communication with the current sensor to determine the angular position of the electric motor as a function of the current circulating through the electric motor, regardless of whether the current is flowing in the primary or secondary directions;
   a bi-directional current sensor in communication with the electric motor and configured for bi-directional sensing of current circulating through the electric motor such that the controller determines the angular position as a function of current sensed with the bi-directional current sensor; and
   a current regulator connected in series with a relay and the electric motor such that the relay connects the current regulator and the electric motor to the external power source in a first position and connects the same to ground in a second position, the first position associated with the primary direction and the second position associated with the secondary direction, and wherein the bi-direction current sensor is connected before the relay and to both sides of the current regulator in order to sense current flowing in the primary and secondary directions regardless of whether the relay is in the first or second position.

6. The system of claim 5 wherein the bi-directional current sensor is configured to sense current flowing in a primary direction and secondary direction.

7. The system of claim 6 wherein the primary direction is associated with current flow from an external power source to the electric motor and the secondary direction is associated with internal current flow resulting from rotation of the electric motor when the external power source is disconnected from the motor.

8. The system of claim 5 further comprising a means for counting current peaks within the current circulating through the electric motor in either of the primary and secondary directions, the controller determining the angular positioning of the electric motor as a function of the peaks counted with the rippled detector.

9. The system of claim 5 further comprising a means for determining a direction of an element moved by the electric motor, the direction detector determining the direction of movement as function of the current flowing in the primary and secondary directions.

10. The system of claim 5 further comprising a means for filtering the sensed current according to a desired frequency range associated with an expected speed range of the electric motor.

11. A method for monitoring operations of an electric motor, the method comprising:
   sensing current flowing in a primary direction and secondary direction through the electric motor, the primary direction associated with current flow from an external power source to the electric motor and the secondary direction associated with internal current flow resulting from rotation of the electric motor when the external power source is disconnected from the motor;

determining an angular position of the electric motor as a function of the current circulating through the electric motor, regardless of whether the current is flowing in the primary or secondary directions; and determining a direction of an element moved by the electric motor, the direction detector determining the direction of movement as function of the current flowing in the primary and secondary directions.

12. The method of claim 11 further comprising determining the angular position as a function of current sensed with a shunt resistor connected in series with a relay and the electric motor such that the relay connects the resistor and the electric motor to the external power source in a first position and connects the same to ground in a second position, the first position associated with the primary direction and the second position associated with the secondary direction, and wherein a bi-direction current sensor is connected before the relay and to both sides of the shunt resistor in order to sense current flowing in the primary and secondary directions regardless of whether the relay is in the first or second position.

13. The method of claim 11 further comprising counting current peaks within the current circulating through the electric motor in either of the primary and secondary directions, the controller determining the angular positioning of the electric motor as a function of the peaks counted with the rippled detector.

14. The method of claim 11 further comprising filtering the sensed current according to a desired frequency range associated with an expected speed range of the electric motor.

15. The method of claim 11 further comprising controlling movement of a window driven by the electric motor as a function of the determined angular position.

16. The method of claim 11 further comprising controlling movement of a vehicle seat driven by the electric motor as a function of the determined angular position.

17. The method of claim 11 wherein the external power source is disconnected when first and second relays used to control current flow between the external power source and the motor are closed to ground.

18. The method of claim 11 wherein sensing current flow in the secondary direction includes sensing current flow after the external power source is disconnected from the motor and after the motor begins circulating in a direction opposite from a direction occurring while current flowed in the primary direction, the opposite direction being associated with rebounding movement imparted to the motor.

* * * * *